TRANSDUCER POSITIONING APPARATUS

Filed Dec. 18, 1962 3 Sheets-Sheet 1

JACK K. WILLIS
INVENTOR.

BY Robert G. Clay

ATTORNEY

Jan. 4, 1966 J. K. WILLIS 3,227,816

TRANSDUCER POSITIONING APPARATUS

Filed Dec. 18, 1962 3 Sheets-Sheet 2

JACK K. WILLIS
INVENTOR.

BY Robert G. Clay

ATTORNEY

Jan. 4, 1966 J. K. WILLIS 3,227,816

TRANSDUCER POSITIONING APPARATUS

Filed Dec. 18, 1962 3 Sheets-Sheet 3

JACK K. WILLIS
INVENTOR.

BY Robert G. Clay

ATTORNEY

United States Patent Office 3,227,816

Patented Jan. 4, 1966

3,227,816

TRANSDUCER POSITIONING APPARATUS

Jack K. Willis, San Bruno, Calif., assignor to Ampex Corporation, Redwood City, Calif., a corporation of California Filed Dec. 18, 1962, Ser. No. 245,570
18 Claims. (Cl. 179—100.2)

This invention relates to magnetic tape recording and reproducing machines, and particularly to tape driving and/or transducing means therefor.

Magnetic tape transports are usually arranged to tension a moving tape across one or more transducing heads so as to cause the tape and heads to be engaged with substantially unvarying pressure. However the length of unsupported tensioned tape near the heads has a tendency to vibrate longitudinally in response to scraping action of the tape against the heads, thus introducing undesirable frequency variations in the recorded or reproduced signal. Machines having such arrangements include the so-called "open loop" machines, in which the tape is tensioned between a capstan-and-pinch-roller assembly and a supply reel, with the heads between; and the so-called "closed loop" machines, in which the tape is looped around an idler and a capstan, both shanks of the tape loop being engaged with the capstan by means of two pinch rollers, and the heads being positioned between the idler and the capstan. The shorter the length of tape is between the capstan and the idler, the higher the frequency of the scraping vibration is, and for some uses the vibration frequency can be made to lie outside a range in which it would be objectionalble. Such vibration is never completely eliminated and in other applications is objectionable.

Some attempts have been made to establish a so-called "zero-loop" arrangement, in which the tape is looped around a large capstan and is everywhere supported thereby in the loop; while the heads are caused to engage the supported segment of tape and to compress it against the capstan. This arrangement is subject to the same disadvantages as are magnetic drum recorders, in that eccentricities of the capstan (drum) and variations in the thickness of the tape, or bulges caused by foreign matter (dust, etc.), cause the head to bounce and thump, and the constant pressure relationship between the head and tape is destroyed.

These difficulties are solved in the machine herein disclosed, which is a zero-loop device, by the provision of a rubber coat on the cylindrical surface of the capstan.

With such a capstan, an attendant problem is that of mounting the transducing heads so that they bear with predetermined resilient pressure against the tape and capstan, and yet can be readily retracted for threading of the tape. On top of these two requirements, the heads must also be mounted in such a way that they resist vibrating in the direction of movement of the tape, as because of variations in the coefficient of friction between the head and tape.

Accordingly, it is an object of the present invention to provide a transducing apparatus in which substantially constant pressure is maintained between the head and tape without longitudinal vibration of the tape or head.

It is still another object of the invention to provide a zero-loop transducing and tape driving apparatus in which substantially constant velocity and tension is maintained in the portion of tape at the transducing head.

It is a further object of the invention to provide a zero-loop device in which the heads are mounted for easy retraction and for engagement with a predetermined resilient pressure, the heads being substantially immune to induced vibration in the direction of tape motion.

It is still another object of the invention to provide a tape driving and transducing apparatus suitable for use in a restricted area and characterized by improved fidelity of performance and operation, the apparatus being constructed of economically manufactured parts and adapted for ready and accurate interchangeability.

In accordance with the invention, a tape is guided to and away from a rotating rubber-coated drum, which may be a drive capstan. The tape is tensioned on both sides of the drum to ensure frictional engagement between the tape and drum. One or more transducing heads are mounted to engage the segment of tape that is on the drum, and the head mountings are spring loaded to ensure constant pressure between the heads and tape. The heads are secured for pivoting retraction from the tape as by means of a spring leaf extending from a base. The spring leaf extends precisely along a plane tangent to the capstan at the point of head engagement therewith, so as to provide the maximum possible resistance to vibration of the head in the direction of tape motion.

Other objects and advantages will be explained in the following specification, considered together with the accompanying drawings, in which.

Figure 1:
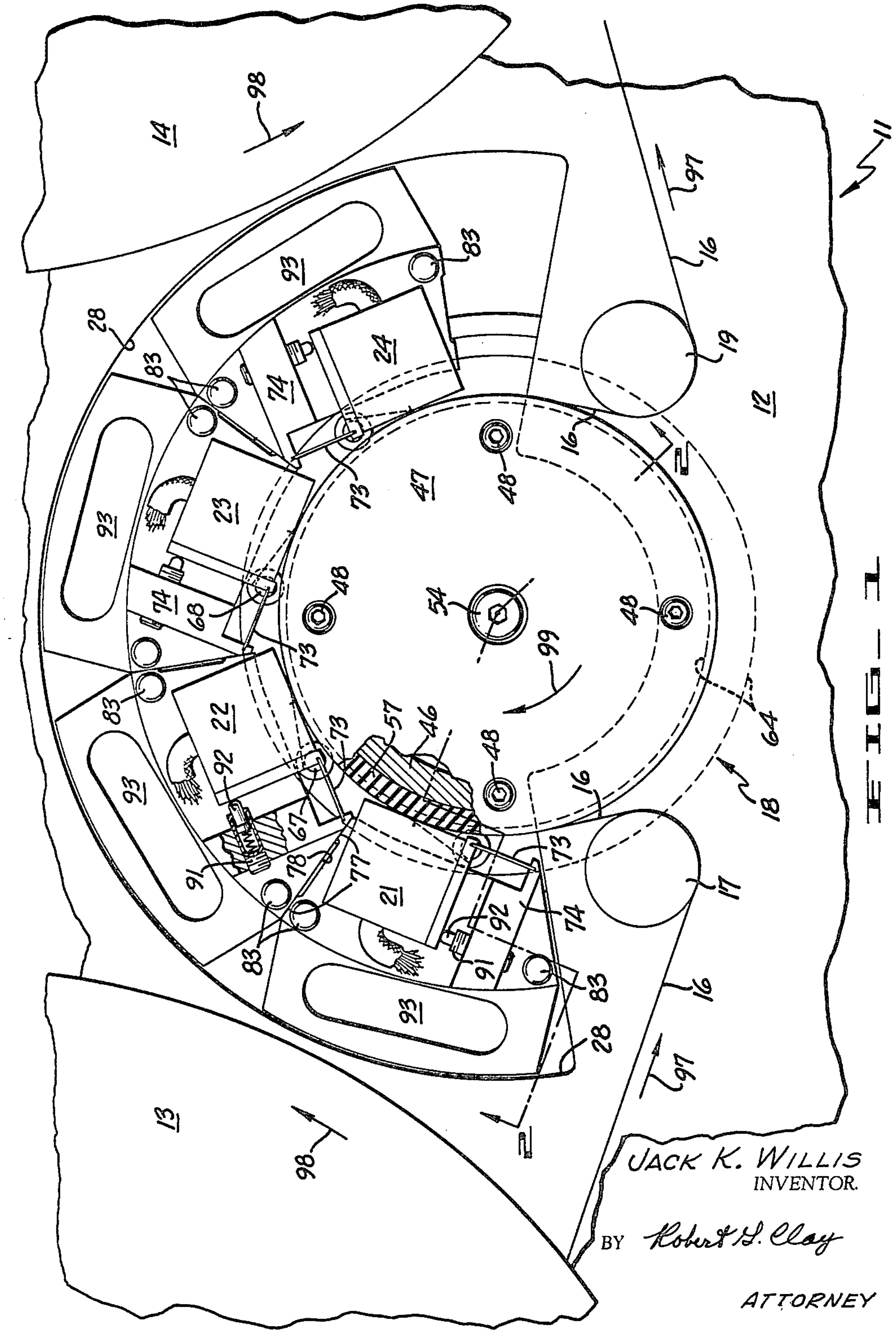
FIGURE 1 is a broken-away plan view of part of a tape transport including a transducing apparatus constructed in accordance with the invention.

Referring now to the drawings, and particularly to FIGURE 1, there is shown a portion of a tape transport 11, including a top plate 12 and supply and take-up reels 13 and 14 for storing and receiving a tape 16. The tape 16 coming from the supply reel 13 is guided around a guide member 17, thence around a rotating drum 18, which in this example is a driven capstan, and thence around a guide 19 to the take-up reel 14. The tape 16 is tensioned on either side of the capstan 18 by means well known in the art, as for example, by controlling the torques individually applied to the reels 13 and 14. A number of transducing heads 21, 22, 23 and 24 are adjustably mounted on the top plate 12 to engage the tape 16 at the capstan 18.

Figure 2:
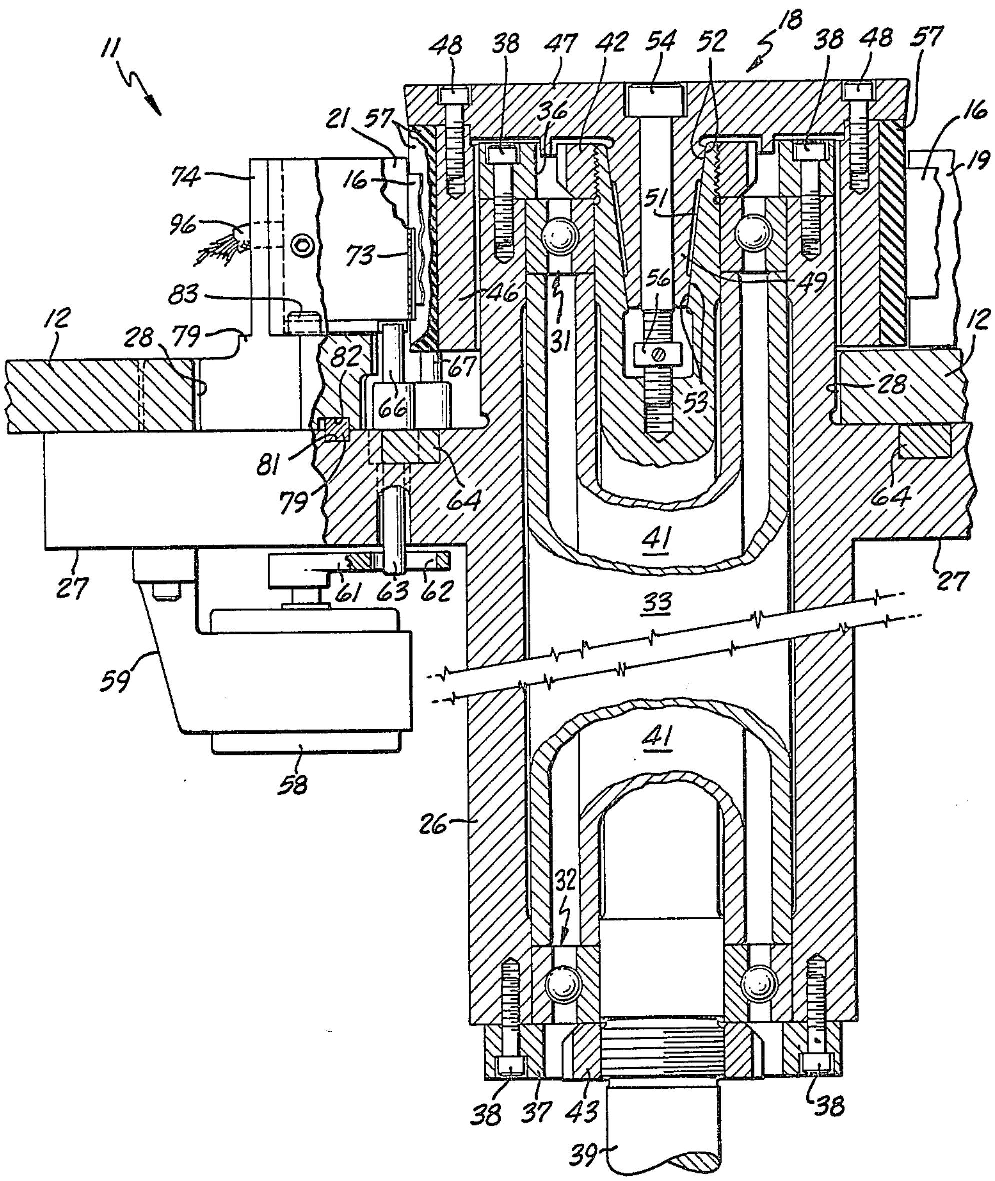
FIGURE 2 is a fragmentary cross-sectional elevation view taken substantially on the plane of lines 2—2 of FIGURE 1.

The construction and mounting of the capstan 18 is shown in FIGURE 2. A capstan mounting element 26, formed as a hollow cylinder having a peripheral flange or mounting plate 27, is mounted by the flange to the underside of the top plate 12 as by bolts (not shown). A portion of the flange 27 and an upwardly extending cylindrical portion of the element 26 are exposed through an opening 28 formed in the top plate 12. Within the element 26, upper and lower capstan bearing assemblies 31 and 32 are mounted, as by means of a spacing sleeve 33; and the assembly is retained by upper and lower retaining rings 36 and 37 that are coupled to the upper and lower ends of the element 26 as by fasteners 38. A capstan shaft 39 is mounted within the bearing assemblies 31, 32, the inner races being spaced apart by a sleeve 41 surrounding the shaft. For retaining the assembly of shaft 39, sleeve 41 and bearings 31, 32 together, upper and lower retaining nuts 42 and 43 are threaded on the shaft 39. The vertical position of the shaft can be adjusted with extreme accuracy by manipulation of the nuts 42 and 43. Furthermore, the threads of the two nuts are of different pitches, so that when turned tight they operate as locking nuts. The capstan is rotated as by motive means (not shown) operating on the lower end of shaft 39.

When the capstan 18 is mounted on the shaft 39, it is desirable to be able to quickly remove the capstan as a preliminary to removal or interchange of the heads without introducing maladjustments in the vertical or centralized positioning of the capstan with respect to the shaft. Accordingly, the capstan is constructed as a cylindrical ring member 46 concentrically mounted on an upper disc 47 as by means of bolts 48. The ring 46 and disc 47 might be manufactured as a single integral part, but are easier to machine if made separately, because the disc 47 has a central downwardly extending conical mounting portion 49, which fits within a corresponding conical recess 51 centralized in the upper end of shaft 39. The portion 49 may be keyed to the shaft if desired. The adjacent portions of the shaft and portion 49 are provided with accurately machined gage surfaces 52 and 53, and are elsewhere relieved, so that quick and accurate centralized re-positioning of the capstan on the shaft is easily effected. The capstan and shaft are retained together by means of a bolt 54 axially piercing the capstan and threaded into the shaft. The bolt 54 is retained on the capstan, when the capstan is removed from the shaft, as by means of a collar 56.

The capstan cylindrical member 46 serves as the base or mounting member for a cylindrical capstan surface layer 57 made of elastomeric material, such as rubber, for engaging the tape 16.

As will be explained later, means are provided for temporary retraction of the heads from contact with the capstan; and these means include, as shown in FIGURE 2, a solenoid 58 mounted as by a bracket 59 on the underside of the flange 27. The solenoid has an operating arm 61 in which is formed a slot 62 engaging a pin 63 that extends downwardly from a ring 64. The ring 64 is set in the upper surface of the flange 27, concentric with the capstan 18. The arrangement is such that energization and de-energization of the solenoid 58 causes the ring 64 to rotate in one direction or the other for moving the various heads between operating and retracted positions. The ring 64 has a number of upwardly extending head-retracting pins 66, 67, 68, and 69, one for each of the heads 21–24.

Figure 3:
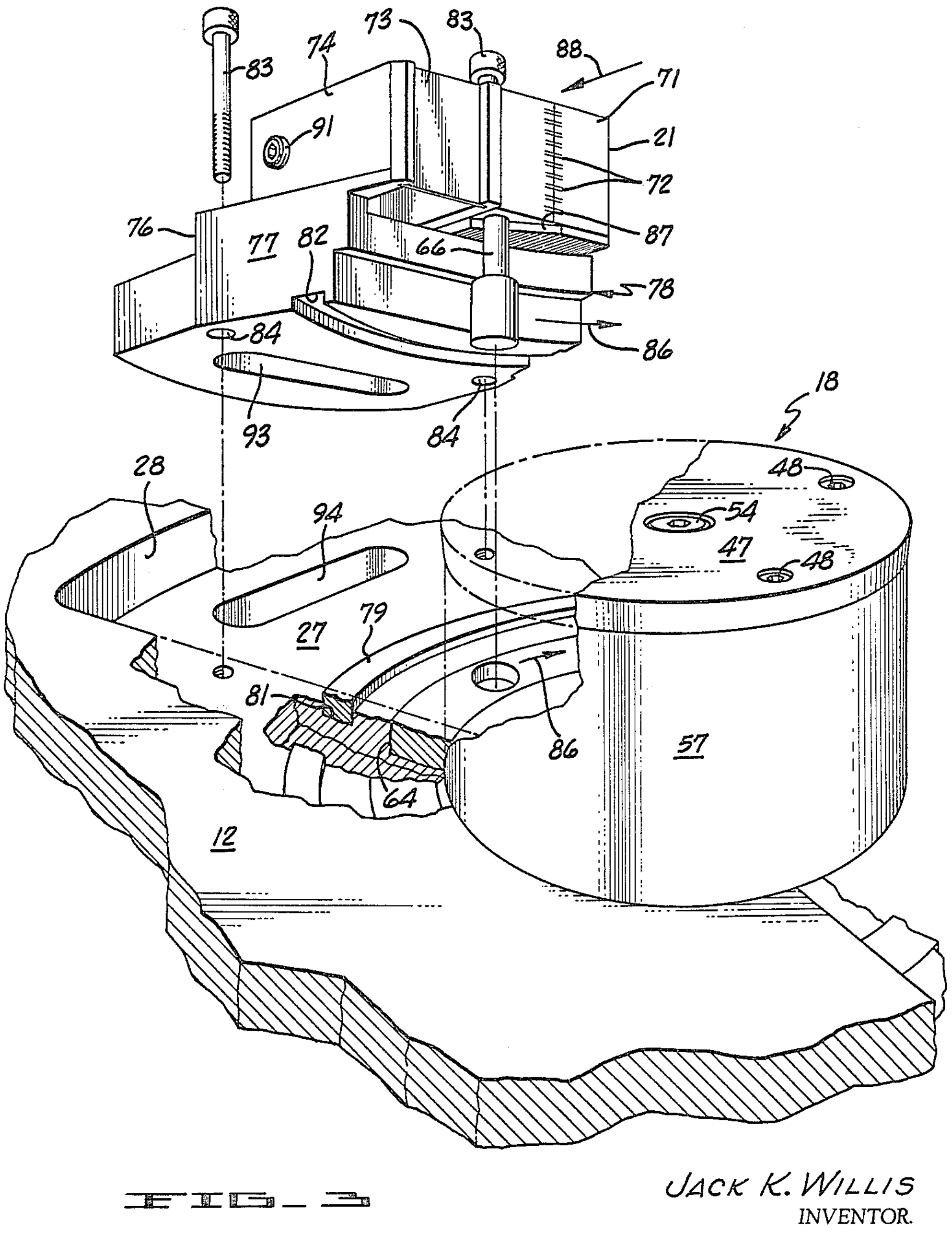
FIGURE 3 is an exploded perspective view of a portion of the apparatus shown in FIGURES 1 and 2.

The construction and assembly of the transducing heads is illustrated in FIGURE 3. The representative head 21 has a flat face 71 in which are set a number of different transducing elements 72 corresponding to the number of magnetic tracks to be recorded on the tape. The head 21 is mounted on a spring leaf 73 extending from a base portion 74 of a mounting block 76 in a "downstream" direction corresponding to the direction of rotation of the capstan 18 (clockwise in FIGURES 1 and 3) so that rotation of the capstan tends to drag the head 21 away from the mounting block 76. However, the spring leaf 73 could extend in an opposite direction with equal effect. It is important to note that the spring leaf 73 extends precisely along a plane that is tangent to the capstan at the point where the head engages the tape and capstan, and that the base 74, to which the spring leaf 73 is attached, also has its attaching portion located in this tangential plane. Thus the spring leaf 73 forms a direct tension link between the head and base 74, in the plane in which acts the frictional force between the tape and head. Thus, ordinary variations in the coefficient of friction between the head and tape have no effect in moving or vibrating the head in this plane.

Each mounting block 76 is formed as a wedge with a pair of angled sides 77 and 78 (see particularly FIGURE 1). In the assembled positions the sides 77–78 lie on axial planes of the capstan 18. These sides are furthermore accurately machined as gage faces so that in the assembled position each of the mounting blocks bears against the adjacent mounting blocks with the result that the transducing elements 72 of the various heads are always equi-angularly spaced from one another, and even when taken apart, can be reassembled and spaced precisely as before.

To provide the mounting blocks 76 with accurate positioning radially from the capstan, a positioning ring 79 is mounted in a conforming groove 81 in the flange 27 and concentric to the capstan. The ring 79 projects above the surface of the flange or plate 27; and each mounting block 76 has a conforming groove 82 for engaging the ring 79. Actually the groove 82 is made with some tolerance so as to fit loosely on the ring, and the radially most inward confronting walls of the ring and groove 82 are accurately machined as gage surfaces, these being the surfaces that are naturally engaged when the apparatus is assembled with the spring 73 pushing the block 76 away from the capstan.

To assemble the heads, first the head 21 is mounted on the ring 79 and is secured by means of bolts 83 fitting loosely in holes 84 in the member 76 and threaded into the flange or mounting plate 27. The looseness of the bolts in the holes 84 permits some degree of adjustment so that the radially most inward confronting walls of the ring 79 and groove 82 can be brought into accurate engagement. However, when the bolts 83 are subsequently tightened, the head is firmly mounted. The second head 22 is then mounted in like manner, except that it is slid circumferentially on the ring to engage the adjacent gage faces 77 and 78 before the bolts 83 are tightened. The other heads are mounted in a similar manner. When all of the heads are mounted in this way, they are positioned with extreme accuracy, solidly against the ring 79 and against one another, and the angular spacings between the transducing elements 72 of the respective heads always are identical.

When it is desired to retrack the heads from the capstan, as for threading the tape, or for fast forward or rewind play of the machine, or for preventing the heads from inducing a permanent "set" in the rubber coating 57 of the capstan during inoperation of the machine, the ring 64 is rotated e.g. in a clockwise or "downstream" direction as shown by arrows 86 in FIGURE 3, thus causing clockwise motion of the pin 66. This pin engages a cam 87 attached to the bottom of the head 21, forcing the head away from the capstan as shown by the arrow 88. All of the heads are thus withdrawn at once. The solenoid may be arranged to cause engagement of the heads upon energization, and retraction of the heads upon de-energization, so as to "fail safe."

In FIGURE 1 there is shown an additional spring means for the head 22, comprising a hollow set screw member 91 threaded through the portion 74 of the block 76 and having a compression-spring-loaded pin 92 projecting therefrom and bearing against the head 22 remote from the leaf spring 73. This arrangement provides a degree of adjustment for the pressure with which the head bears against the tape and capstan.

Openings 93 and 94 are provided in the base member 76 and the flange 27 respectively, for the mounting of mating electric plug and socket connectors (not shown), by means of which electric coupling is made to lead wires 96 of the head.

In operation, the tape 16 is moved (arrows 97) from the supply reel to the take-up reel (arrows 98) by the capstan 18 (arrow 99), while the spring means 91 cause the head to engage the tape with substantially constant pressure. The spring leaf 73 serves as a direct tension link between the head and its corresponding base 74. The spring leaf is desirably stressed as little as possible, because if it is deformed into a curved or an S-shape, then variations in the coefficient of friction between the head and tape, such as are inevitable with the classes of tape now known, would cause a type of elongation due to temporary straightening, or a type of shortening due to buckling or increased bending of the spring leaf, and vibration of the head in the direction of motion of the tape could not be completely avoided. However in the present device as illustrated, the force urging the head against the tape is provided by the spring means 91–92, and the spring leaf 73 does not need to be stressed appreciably, and is not deformed to a degree that it fails to form a straight-line direct tension link between the head and base 74.

It is noted that the leaf spring 73 alone may be used, without the spring means 91–92, provided the leaf spring 73 is thick enough and stiff enough to supply the normal pressure desired, of the head against the tape. As noted above, the essential requirement is that the leaf spring 73, even when it is stressed to its maximum operating degree, still is not deformed to the extent that it is bent out of a plane that is tangent to the capstan at the point where the head engages the tape. So long as the spring leaf 73 forms a direct tension (or compression) link between the head and base 74 within this tangential plane, the resistance of the head to vibration in this plane will be preserved.

It is also noted that the spring leaf 73 has certain advantages over a simple pivoted arm, in that such an arm is subject to looseness and play at the rotating bearing that would have to be provided, and would consequently permit vibration of the head in the direction of the tape movement.

Thus, there has been described a transducing apparatus including a rotating rubber coated drum, which may be a driving capstan. Means are provided to cause frictional engagement of the tape and drum, and transducing heads are mounted as by springs to engage the supported portion of tape to ensure constant pressure between the heads and tape. The heads are secured for pivoting retraction from the tape as by means of a spring leaf extending from a base. The spring leaf extends precisely along a plane tangent to the capstan at the point of head engagement therewith, so as to provide the maximum possible resistance to vibration of the head in the direction of tape motion.

What is claimed is:

1. In an apparatus for mounting a transducing head for engagement with a predetermined surface of a record medium that is moving in a predetermined plane tangent to said surface at the zone of said engagement, the improvement comprising:

a base mounted to intersect said plane in which said medium is moving in the zone of said engagement; and an element extending in said plane directly from said base to said head for restraining said head against movement in said plane, said element being displaceable to permit movement of said head toward and away from said medium;

whereby the position of said head in said plane is solidly maintained despite variations in the coefficient of friction between said head and medium.

2. In an apparatus for mounting a transducing head for engagement with a predetermined surface of a record medium that is moving in a predetermined plane tangent to said surface at the zone of said engagement, the improvement comprising:

a base mounted to intersect said plane in which said medium is moving in the zone of said engagement; and means for urging said head toward said medium and for restraining said head against movement in said plane;

said means including an element extending in said plane directly from said base to said head, said elements being displaceable to permit movement of said head toward and away from said medium;

whereby the position of said head in said plane is solidly maintained despite variations in the coefficient of friction between said head and medium.

3. An apparatus for mounting a transducing head for pressurized engagement with a predetermined surface of a record medium that is moving in a predetermined plane tangent to said surface at the zone of said engagement, comprising:

a base mounted to intersect said plane in which said medium is moving in a zone of said engagement; and a spring leaf extending in said plane directly between and solidly coupled to said base and said head for restraining said head against movement in said plane;

said spring leaf being stressed in the engaged position to a degree sufficient to provide said pressurized engagement of said head and medium, but to a degree less than would permit said spring leaf to buckle or straighten under the unfluence of the frictional force between said head and medium;

whereby the position of said head in said plane is solidly maintained despite variations in the coefficient of friction between said head and medium.

4. An apparatus for mounting a transducing head for pressurized engagement with a predetermined surface of a record medium that is moving in a predetermined plane tangent to said surface at the zone of said engagement, comprising:

a base mounted upstream from the zone of said engagement and intersecting said plane in which said medium is moving in said zone; and a spring leaf extending in said plane directly between and solidly coupled to said base and said head for restraining said head against movement in said plane;

said spring leaf being stressed in the engaged position to a degree sufficient to provide said pressurized engagement of said head and medium, but to a degree less than would permit said spring leaf to straighten under the influence of the frictional force between said head and medium;

whereby the position of said head in said plane is solidly maintained despite variations in the coefficient of friction between said head and medium.

5. In an apparatus for mounting a transducing head for engagement with a predetermined surface of a record medium that is moving in a predetermined plane tangent to said surface at the zone of said engagement, the improvement comprising:

a base mounted to intersect said plane in which said medium is moving in the zone of said engagement; and means for urging said head toward said medium and for restraining said head against movement in said plane;

said means including a spring leaf extending in said plane directly between and solidly coupled to said base and said head, said spring leaf being bendable to permit movement of said head toward and away from said medium;

whereby the position of said head in said plane is solidly maintained despite variations in the coefficient of friction between said head and medium.

6. In an apparatus for mounting a transducing head for engagement with a predetermined surface of a record medium that is moving in a predetermined plane tangent to said surface at the zone of said engagement, the improvement comprising:

a base mounted to intersect said plane in which said medium is moving in the zone of said engagement; and means for urging said head toward said medium and for restraining said head against movement in said plane;

said means including a spring leaf extending in said plane directly between and solidly coupled to said base and said head, said spring leaf being bendable to permit movement of said head toward and away from said medium;

said spring leaf being stressed in the engaged position to a degree sufficient to provide said pressurized engagement of said head and medium, but to a degree less than would permit said spring leaf to buckle or straighten under the influence of frictional changes between said head and medium;

whereby the position of said head in said plane is solidly maintained despite variations in the coefficient of friction between said head and medium.

7. In a apparatus for mounting a transducing head for engagement with a predetermined surface of a record medium that is moving in a predetermined plane tangent to said surface at the zone of said engagement, the improvement comprising:

a base mounted upstream from the zone of said engagement and intersecting said plane in which said medium is moving in said zone; and means for urging said head toward said medium and for restraining said head against movement in said plane;

said means including a spring leaf extending in said plane directly between and solidly coupled to said base and said head, said spring leaf being bendable to permit movement of said head toward and away from said medium;

said spring leaf being stressed in the engaged position to a degree sufficient to provide said pressurized engagement of said head and medium, but to a degree less than would permit said spring leaf to straighten under the influence of the frictional force between said head and medium;

whereby the position of said head in said plane is solidly maintained despite variations in the coefficient of friction between said head and medium.

8. An apparatus for mounting a transducing head for pressurized engagement with a predetermined surface of a record medium that is moving in a predetermined plane tangent to said surface at the zone of said engagement, comprising:

a base mounted to intersect said plane in which said medium is moving in the zone of said engagement;

an element extending in said plane directly between and coupling said base and said head for restraining said head against movement in said plane, said element being displaceable to permit movement of said head toward and away from said medium; and means for urging said head toward said medium to effect said pressurized engagement.

9. An apparatus for mounting a transducing head for pressurized engagement with a predetermined surface of a record medium that is moving in a predetermined plane tangent to said surface at the zone of said engagement, comprising:

a base mounted to intersect said plane in which said medium is moving in the zone of said engagement;

an element extending in said plane directly between and coupling said base and said head for restraining said head against movement in said plane, said element being displaceable to permit movement of said head toward and away from said medium; and compression spring means engaging said head and urging said head to pivot about said base in a direction to engage said medium.

10. An apparatus for mounting a transducing head for pressurized engagement with a predetermined surface of a record medium that is moving in a predetermined plane tangent to said surface at the zone of said engagement, comprising:

a base mounted to intersect said plane in which said medium is moving in the zone of said engagement;

a spring leaf extending in said plane directly between and solidly coupled to said base and said head for restraining said head against movement in said plane, said spring leaf being bendable to permit movement of said head toward and away from said medium; and compression spring means engaging said head and urging said head to pivot about said base in a direction to engage said medium.

11. An apparatus for mounting a transducing head for pressurized engagement with a predetermined surface of a record medium that is moving in a predetermined plane tangent to said surface at the zone of said engagement, comprising:

a base mounted to intersect said plane in which said medium is moving in the zone of said engagement;

an element extending in said plane directly between and coupling said base and said head for restraining said head against movement in said plane, said element being displaceable to permit movement of said head toward and away from said medium;

means for urging said head toward said medium to effect said pressurized engagement; and means for selectively retracting said head from said medium against the urging of said urging means.

12. An apparatus for mounting a transducing head for pressurized engagement with a predetermined surface of a record medium that is moving in a predetermined plane tangent to said surface at the zone of said engagement, comprising:

a base mounted to intersect said plane in which said medium is moving in the zone of said engagement;

a spring leaf extending in said plane directly between and solidly coupled to said base and said head for restraining said head against movement in said plane, said spring leaf being bendable to permit movement of said head toward and away from said medium;

compression spring means engaging said head and urging said head to pivot about said base in a direction to engage said medium; and means for selectively retracting said head from said medium against the spring forces of said spring leaf and said compression spring means.

13. In a tape transport, an apparatus for causing pressurized engagement between a transducing head and a predetermined surface of a tape that is moving in a predetermined plane tangent to said surface in the zone of said engagement, comprising:

means for supporting said moving tape on the side thereof directly opposite said head;

a base mounted to intersect said plane in which said tape is moving in the zone of said engagement; and means for urging said head toward said tape and for restraining said head against movement in said plane;

said means including an element extending in said plane directly from said base to said head, said element being displaceable to permit movement of said head toward and away from said tape;

whereby the position of said head in said plane is solidly maintained despite variations in the coefficient of friction between said head and tape.

14. In a tape transport, an apparatus for causing pressurized engagement between a transducing head and a predetermined surface of a tape that is moving in a predetermined plane tangent to said surface in the zone of said engagement, comprising:

a cylindrical rotating member circumferentially engaging and supporting said tape on the side thereof directly opposite said head and rotating in the direction of movement of said tape;

a base mounted to intersect said tangential plane in which said tape is moving in the zone of said engagement; and means for urging said head toward said tape and for restraining said head against movement in said plane;

said means including a spring leaf extending in said plane directly from said base to said head, said spring leaf being bendable to permit movement of said head toward and away from said tape.

15. In a tape transport, an apparatus for causing pressurized engagement between a transducing head and a predetermined surface of a tape that is moving in a predetermined plane tangent to said surface in the zone of said engagement, comprising:

a cylindrical rotating member circumferentially engaging and supporting said tape on the side thereof directly opposite said head and rotating in the direction of movement of said tape;

a base mounted to intersect said tangential plane in which said tape is moving in the zone of said engagement;

a spring leaf extending in said plane directly between and solidly coupled to said base and said head, said spring leaf being bendable to permit movement of said head toward and away from said tape; and means for urging said head toward said tape to effect said pressurized engagement.

16. In a tape transport, an apparatus for causing pressurized engagement between a transducing head and a predetermined surface of a tape that is moving in a predetermined plane tangent to said surface in the zone of said engagement, comprising:

a cylindrical rotating member circumferentially engaging and supporting said tape on the side thereof directly opposite said head and rotating in the direction of movement of said tape;

a base mounted to intersect said tangential plane in which said tape is moving in the zone of said engagement; and a spring leaf extending in said plane directly between and coupled to said base and said head, said spring leaf being bendable to permit movement of said head toward and away from said tape; and compression spring means engaging said head and urging said head to pivot about said base in a direction to engage said tape.

17. In a tape transport, an apparatus for causing pressurized engagement between transducing head and a predetermined surface of a tape that is moving in a predetermined plane tangent to said surface in the zone of said engagement, comprising:

a cylindrical rotating member circumferentially engaging and supporting said tape on the side thereof directly opposite said head and rotating in the direction of movement of said tape;

a base mounted upstream from said head and intersecting said tangential plane in which said tape is moving in the zone of engagement with said head;

a spring leaf extending in said plane directly between and solidly coupled to said base and said head, said spring leaf being bendable to permit movement of said head toward and away from said tape;

compression spring means engaging said head and urging said head to pivot about said base in a direction to engage said tape; and means for selectively retracting said head from said medium against the spring forces of said spring leaf and said compression spring means.

18. In a tape transport, an apparatus for causing pressurized engagement between a moving tape and a plurality of transducing heads, comprising:

a mounting plate;

a cylindrical rotating capstan projecting from said plate, said capstan having a compliant surface circumferentially engaging said tape and rotating in the direction of movement of said tape;

a first ring element mounted on said plate coaxial with said capstan, said first ring element being partly embedded in said plate so as to project therefrom in the same direction as said capstan;

a plurality of mounting blocks, one for each of said transducing heads, each of said blocks having an arc-shaped groove formed in a first side thereof and mating with said first ring element, with only the radially most inward walls of said groove and first ring element engaged, so as to accurately position said block radially with respect to the surface of said capstan;

each of said blocks having a pair of second sides conforming to axial planes of said capstan, said second sides of adjacent blocks being engaged for accurately positioning said blocks peripherally of said capstan;

means for clamping each of said blocks to said mounting plate;

each of said blocks having a base portion projecting in the same direction as said capstan and lying at least in a plane that is tangent to said capstan at the zone of said engagement of said tape and the respective head, each of said projecting portions being upstream from the respecting zone of engagement;

a spring leaf solidly mounted on each of said projecting base portions and extending in said tangential plane downstream toward said zone, the respective head being solidly mounted on said respective spring leaf;

each of said blocks and the corresponding head having a pair of confronting spaced faces lying in planes parallel to said mounting plate;

a quantity of damping fluid disposed between each of said pair of confronting spaced faces;

a set-screw containing a compression-spring-loaded pin threaded through each of said projecting portions upstream from the respective head and with said pin engaging said respective head so that the spring force thereof is applied to urge said respective head to pivot around said respective spring leaf and to engage said tape with a predetermined pressure;

a second ring element rotatably slidably mounted coaxial with said capstan and in a conforming groove in said mounting plate, said second ring element having a plurality of pins, one for each head, projecting toward said respective heads;

each of said heads having a cam surface formed thereon for engagement with a respective one of said pins for causing retraction of said respective head from said tape and capstan upon rotation of said second ring element in the direction of movement of said tape and capstan; and a solenoid coupled to said second ring element for selective rotation thereof to retract and reapply said heads from and to said tape and capstan.

References Cited by the Examiner

UNITED STATES PATENTS

| | | | |
|---|---|---|---|
| 2,802,905 | 8/1957 | Taris | 179—100.2 |
| 2,862,781 | 12/1958 | Baumeister | 179—100.2 |
| 2,961,494 | 11/1960 | Darou et al. | 179—100.2 |
| 3,039,102 | 6/1962 | Fuller et al. | 179—100.2 |

FOREIGN PATENTS

| | | |
|---|---|---|
| 151,921 | 7/1950 | Australia. |
| 590,297 | 1/1960 | Canada. |

IRVING L. SRAGOW, *Primary Examiner.*